US010696399B2

(12) United States Patent
Erickson et al.

(10) Patent No.: US 10,696,399 B2
(45) Date of Patent: Jun. 30, 2020

(54) MAINTENANCE OF A MACHINE

(71) Applicant: International Business Machines Corporation, Armonk, NY (US)

(72) Inventors: Thomas D. Erickson, Minneapolis, MN (US); Kala Fleming, Nairobi (KE); Clifford A. Pickover, Westchester, NY (US); Komminist Weldemariam, Nairobi (KE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/681,584

(22) Filed: Nov. 12, 2019

(65) Prior Publication Data

US 2020/0079506 A1     Mar. 12, 2020

Related U.S. Application Data

(62) Division of application No. 15/398,929, filed on Jan. 5, 2017, now Pat. No. 10,569,872.

(51) Int. Cl.
*B64C 39/02* (2006.01)
*F16N 9/00* (2006.01)
*B64D 1/16* (2006.01)
*G05D 1/00* (2006.01)

(52) U.S. Cl.
CPC ............ *B64C 39/024* (2013.01); *B64D 1/16* (2013.01); *F16N 9/00* (2013.01); *G05D 1/0094* (2013.01); *B64C 2201/12* (2013.01); *B64C 2201/127* (2013.01); *B64C 2201/128* (2013.01); *B64C 2201/141* (2013.01); *F16N 2210/12* (2013.01)

(58) Field of Classification Search
CPC ............ B64C 2201/00; B64C 2201/02; B64C 2201/12; B64C 2201/126; B64C 2201/128; B64C 2201/127; B64C 2201/141; B64C 39/00; B64C 39/02; B64C 39/024; F16N 9/00; G05D 1/0088
See application file for complete search history.

(56) References Cited

U.S. PATENT DOCUMENTS

| 8,939,259 B2 | 1/2015 | Mallada et al. ............. 184/6.12 |
| 10,155,587 B1 | 12/2018 | Tang ..................... B64C 39/024 |
| 2013/0068564 A1 | 3/2013 | Stebner ........................ 184/109 |

(Continued)

FOREIGN PATENT DOCUMENTS

| CA | 2772754 | 9/2012 |
| CN | 201964125 | 9/2011 |
| WO | WO 2009034584 A1 | 3/2009 |

OTHER PUBLICATIONS

Julien Le Bleu Jr., "Detect machine problems early: Best practices for operators" http://www.reliableplant.com/Read/24899/detect-problems-best-practice, pp. 1-11.

(Continued)

*Primary Examiner* — Benjamin P Lee
(74) *Attorney, Agent, or Firm* — Ido Tuchman; Eyal Gilboa (57) ABSTRACT

A computer program product for maintaining a machine. The system includes an aerial vehicle configured to fly to a lubrication location proximate the machine. A supply of friction minimizing material is carried by the aerial vehicle. A controller is configured to deliver at least part of the supply of friction minimizing material to the machine when the aerial vehicle is at the lubrication location.

7 Claims, 4 Drawing Sheets

(56) References Cited

U.S. PATENT DOCUMENTS

| | | | |
|---|---|---|---|
| 2015/0274294 A1 | 10/2015 | Dahlstrom | B64D 1/18 |
| | | | 239/722 |
| 2016/0075422 A1 | 3/2016 | Goldstein | |
| 2017/0010624 A1 | 1/2017 | Carpenter | B64C 39/024 |
| 2017/0113787 A1 | 4/2017 | Hein | |
| 2017/0129605 A1 | 5/2017 | Wu et al. | |
| 2017/0328814 A1 | 11/2017 | Castendyk | B64C 39/024 |
| 2018/0000575 A1 | 1/2018 | Fobi | A61D 7/00 |
| 2018/0043386 A1 | 2/2018 | Busby | B05B 13/005 |
| 2018/0118340 A1 | 5/2018 | Russo | B64D 1/16 |
| 2018/0194464 A1 | 7/2018 | Elder | B64C 39/024 |
| 2018/0326441 A1 | 11/2018 | Liu | G05D 1/10 |
| 2019/0009907 A1 | 1/2019 | Wu | B64C 39/024 |

OTHER PUBLICATIONS

Wayne Mitchell, "Automated Lubrication—Benefits and Design Options" http://www.machinerylubrication.com/Read/175/automated-lubrication, pp. 1-6.

"West Africa's vast industrial zone" http://www.dw.com/en/west-africas-vast-industrial-zone/g-18158703, pp. 1-6.

"Electric Motor Bearing Lubrication and Regreasing" http://www.lubewhiz.in/electric_motor_baering_lubrication_regreasing.html, pp. 1-8.

MAINTENANCE OF A MACHINE

CROSS-REFERENCE TO RELATED APPLICATIONS

This application is a divisional of and claims priority under 35 U.S.C. § 121 to U.S. patent application Ser. No. 15/398,929, filed Jan. 5, 2017, titled "MAINTENANCE OF A MACHINE", and is incorporated herein by reference in its entirety.

BACKGROUND

The present invention is directed toward unmanned vehicles, and, more particularly, to lubricating a machine using an unmanned aerial vehicle.

Machines with moving parts often require lubrication. A lubricant primarily helps reduce friction between surfaces in mutual contact. However, lubrication can have many addition benefits, such as: keeping moving parts separated, transferring heat, carrying away contaminants and debris, transmitting power, protecting against wear, preventing corrosion and rust, creating a gas seal, avoiding smoke and fire of objects.

Maintaining properly lubricated parts is not always straightforward. A lubrication schedule can necessitate focus on future planning rather than near-term needs. Additionally, machine operation regimes can be complex. When resources are scarce, equipment often runs for longer times than its design specifications. Frequent start and stop cycles can exacerbate the wear and tear on machinery. Reuse of old parts and old equipment can require mechanics and other technicians to determine repair and maintenance via trial and error.

Furthermore, difficult to reach lubrication points can pose a safety risk to employees and add significant expense to a lubrication schedule. For example, modern wind turbines can be elevated hundreds of feet from the ground. Proper lubrication of elevated wind turbines may require technicians to climb tall turbine towers in harsh environments.

BRIEF SUMMARY

One example aspect of the present invention is a system for lubricating a machine. The system includes an unmanned aerial vehicle configured to fly to a lubrication location proximate the machine. A supply of lubricant is carried by the unmanned aerial vehicle. A controller is configured to deliver at least part of the supply of lubricant to the machine when the unmanned aerial vehicle is at the lubrication location.

Another example aspect of the present invention is a method for lubricating a machine. The method includes flying an unmanned aerial vehicle to a lubrication location proximate the machine. The unmanned aerial vehicle includes a supply of lubricant. A delivering operation delivers at least part of the supply of lubricant to the machine when the unmanned aerial vehicle is at the lubrication location.

Yet a further example aspect of the present invention is a computer program product for lubricating a machine. The computer program product includes computer readable program code configured to: fly an unmanned aerial vehicle to a lubrication location proximate the machine; and deliver at least part of a supply of lubricant carried by the unmanned aerial vehicle to the machine when the unmanned aerial vehicle is at the lubrication location.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION

The present invention is described with reference to embodiments of the invention. Throughout the description of the invention reference is made to FIGS. 1-4. When referring to the figures, like structures and elements shown throughout are indicated with like reference numerals.

Figure 1:
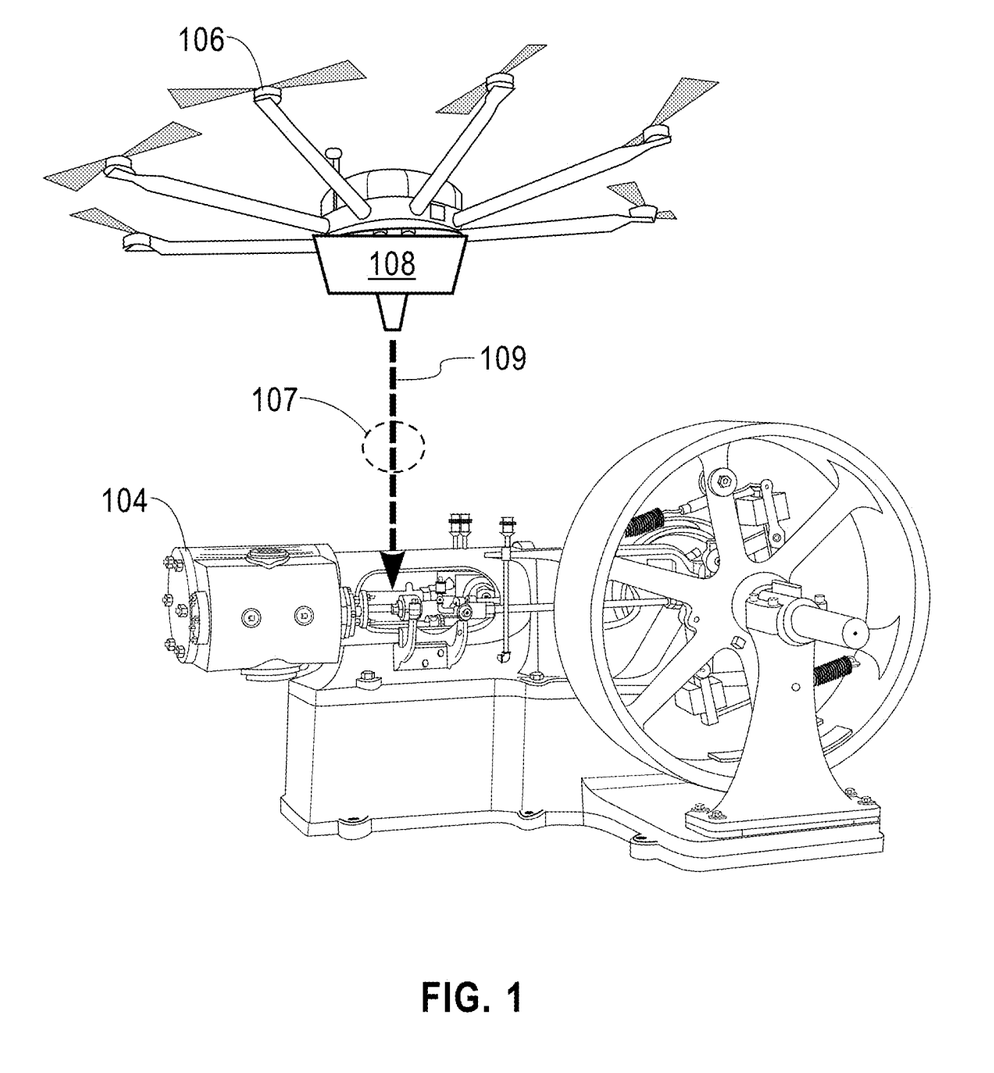
FIG. 1 shows an example system for lubricating a machine, as contemplated by the present invention.

Aspects of the present invention include a machine or a piece of equipment with an exposed gear shaft in need of lubrication located in an inaccessible place in a factory. As shown in FIG. 1, an unmanned aerial vehicle (UAV) 106 (also referred to herein as a drone) with a supply of one or more lubricants 108 flies to lubrication location 107. The lubrication location 107 may be close to an exposed gear shaft in the machine 104. As discussed further below, the UAV 106 may include a means to detect the machine's need for lubricant. Based on the means for detection, the UAV 106 supplies appropriate lubricant 109 to the exposed gear shaft.

Figure 2:
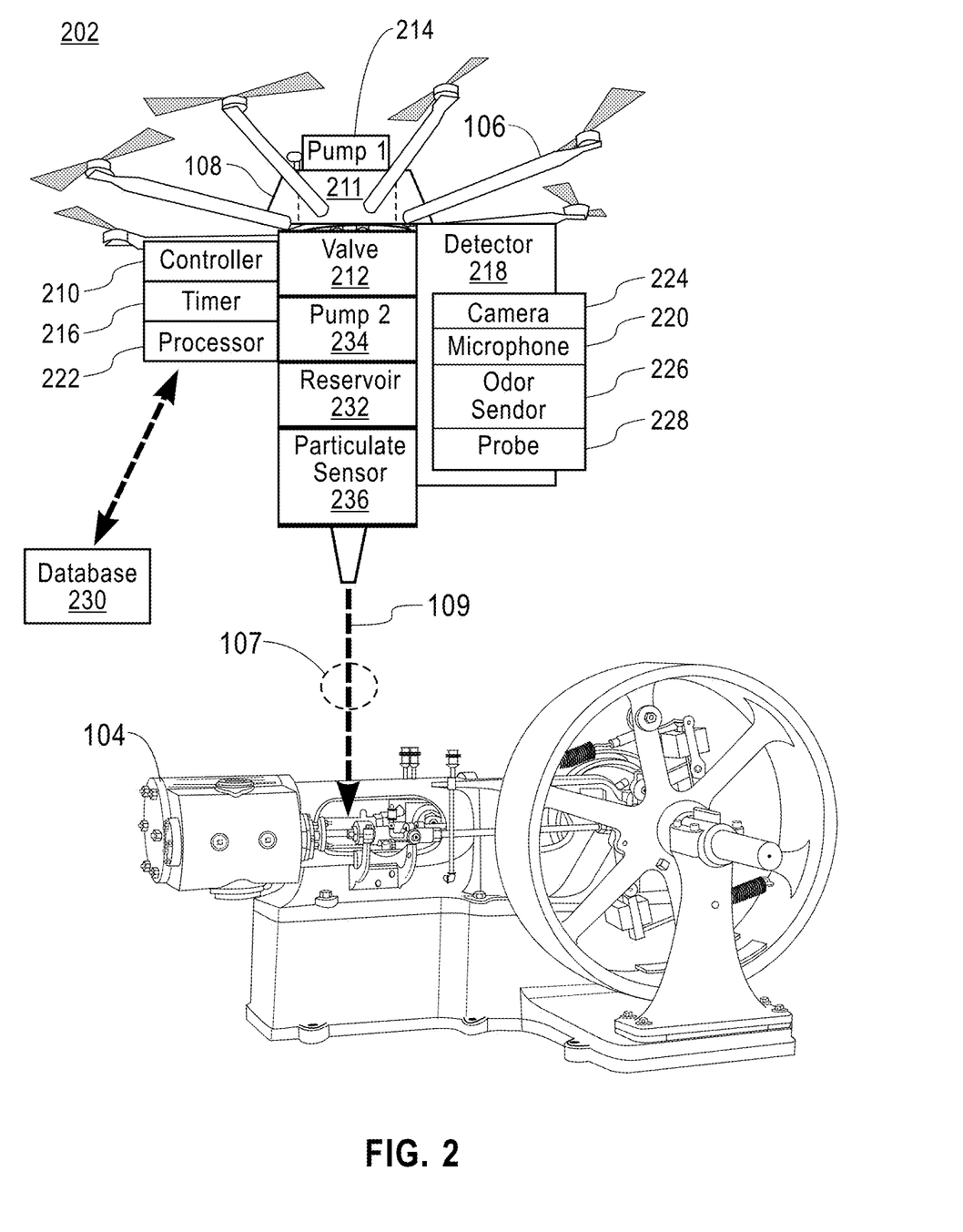
FIG. 2 shows the example system for lubricating a machine of FIG. 1 in more detail.

FIG. 2 shows an example system 202 for lubricating a machine 104, as contemplated by the present invention. The system 202 includes a UAV 106 configured to fly to a lubrication location 107 proximate the machine 104. In one embodiment, the UAV 106 is a multirotor copter. The lubrication location 107 may be inside, on the surface of or above the machine 104.

The UAV 202 includes a supply of lubricant 108 and a controller 210 configured to deliver at least some of the lubricant supply 109 to the machine 104 when the UAV is at the lubrication location 107. As used herein, a controller includes a driver circuit. Typically, a driver circuit includes one or more high power transistors to switch on and off a motor, servo and/or solenoid. A controller may include a relay or another switching component.

In one embodiment, the lubricant supply 108 includes containers 211 to hold a plurality of different lubricants. For example, the UAV 106 may have one or more compartments, tubes, or bottles containing different lubricants. The containers 211 may be arranged in a carousel. Furthermore, the controller 210 can be configured to select one of the different lubricants to deliver to the machine 104 when the UAV 106 is at the lubrication location 107.

Selection of an appropriate lubricant 109 by the controller 210 can be based on data in a database, along with rules, a problem history of the machine 104, and/or signals at the lubrication location 106 (e.g., a code on the machine 104). The lubricant appropriateness maybe based on a consideration of various lubricant characteristics and purposes: high boiling point and low freezing point (in order to stay liquid within a wide range of temperature), the need or lack of need for a high viscosity index, thermal stability, hydraulic stability, demulsibility, corrosion prevention, and high resistance to oxidation. Lubricant availability is also tracked based on appropriateness for a particular environment.

The lubricants may contain liquids and components, such as petroleum, mineral oils, additives to reduce friction and wear, and additives to improve viscosity index, resistance to corrosion and oxidation, aging or contamination. The lubricants may include non-liquids, such as grease, powders, graphite, molybdenum disulfide and tungsten disulfide. The additives may further include agents that affect any of the following characteristics: antioxidants, detergents, anti-wear, metal deactivators, corrosion inhibitors, rust inhibitors, friction modifiers, extreme pressure, anti-foaming agents, viscosity index improvers, demulsifying/emulsifying, stickiness improver, provide adhesive property towards tool surface (in metalworking), and a complexing agent (in case of greases).

When the UAV 106 is at the lubrication location 107, the UAV 106 may spray or drip lubricant 109 into a hole, interface, bearings, rolling elements, and the like on the machine 104. In one embodiment, the UAV 106 includes a valve 212 configured to pass at least part of the lubricant supply 108 from the UAV to the machine when activated by the controller 210. The UAV 106 may include a first pump 214 configured to pump at least part of the lubricant supply 108 from the UAV 106 to the machine 104 when activated by the controller 210. For example, the UAV 106 may employ a grease injection pump. In some cases, the UAV 106 may supply a lubricating grease, quantitatively conveyed to a lubricating grease filling position in a timed way through an injection joint.

In one embodiment, the UAV 106 includes a timer 216 configured to signal the UAV 106 to deliver at least part of the lubricant supply 108 to the machine 104 at a regular time interval. The UAV 106 may include a detector 218 configured to detect that the machine 104 requires lubrication. In such a configuration, the detector 218 signals the controller 210 to deliver at least part of the lubricant supply 108 to the machine 104 upon detection that the machine 104 requires lubrication.

In a particular embodiment, the UAV 106 includes a microphone 220 configured to convert sound generated by the machine 104, while the machine 104 is in operation, to an audio signal. A computer processor 222 is configured to analyze the audio signal and detect an audio indicator that the machine 104 requires lubrication. The audio indicator may include a humming sound, a periodic sound, a squeaking sound, a scraping sound, and/or a clicking sound.

The UAV 106 may include a camera 224 configured to provide a video signal of the machine 104 while the machine 104 is in operation. The computer processor 222 is configured to analyze the video signal to detect a video indicator that the machine 104 requires lubrication. The video indicator may include a lubricant leak, a lubricant level, a machine vibration, a pressure gauge level, burned paint, a belt thickness, and/or thermal radiation.

The UAV 106 may include an odor sensor 226 configured to convert odor generated by the machine 104 while the machine is in operation to an odor signal. The computer processor 222 is configured to analyze the odor signal to detect an odor indicator that the machine 104 requires lubrication. The odor indicator may include a rubber odor, a burning oil odor and/or a burning paint odor.

The UAV 106 may further include a probe 228 configured to provide a probe signal that the machine requires lubrication to the detector. The probe signal may include a vibration measurement, a temperature measurement, changes in the vibration measurement since a past measurement, changes in the heat measurement since a past measurement, and/or a difference in temperature between two regions of the machine 104.

The system 202 may include a database 230 to facilitate lubrication forecasting. When the UAV 106 lubricates a part, or determines a part does not need lubrication, it will report the results to a server which maintains a database 230 of parts, and the frequency, types, and amounts of lubrication they need. Over time, this will enable forecasting of when a part is likely to need lubrication, and also when the part needs to be replaced. The database 230 also considers context of use of the part, such as hot or cold external temperature cycles verses continuous high heat and humidity environments, and the age of the part.

Thus, the need for a lubricant adjustment may be based on audio characteristics of a running device or component, a history of wear of device or a similar device, a visual detection of rust or corrosion, a checking of oil level, a checking of smell, a checking of color, and so on.

In one embodiment, the system 202 includes a lubricant reservoir 232 carried by the UAV 106. The lubricant reservoir 232 is configured to contain lubricant removed from the machine 104 by the UAV 106. A second pump 234 carried by the UAV 106 is configured to transfer used lubricant from the machine 104 to the lubricant reservoir 232. A particulate sensor 236 is configured to detect particulates in the used lubricant. Thus, the UAV 106 may optionally perform an oil analysis of a lubricant's properties, suspended contaminants, and wear debris.

Figure 3:
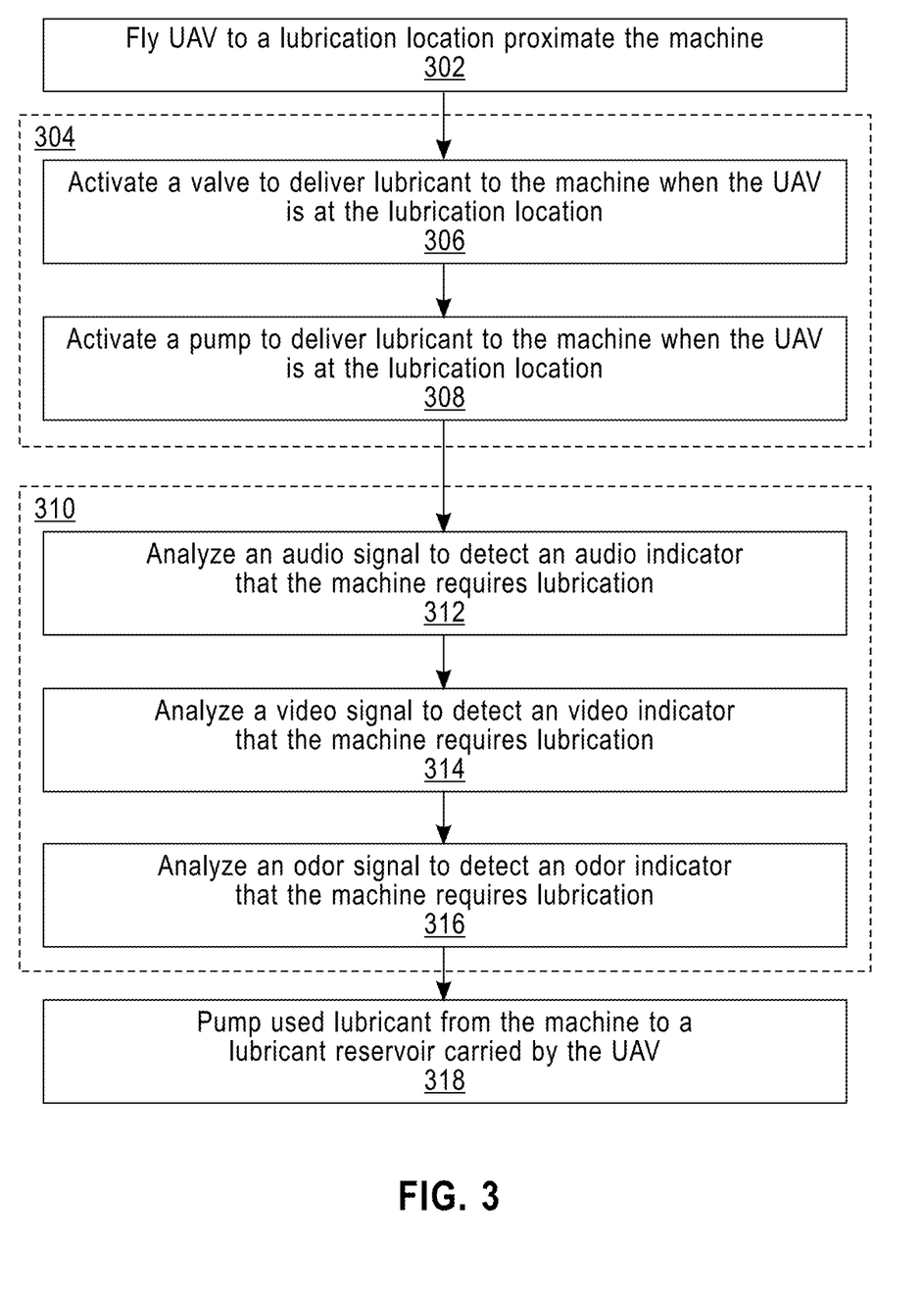
FIG. 3 shows an example method for lubricating a machine, as contemplated by the present invention.

FIG. 3 shows an example method for lubricating a machine, as contemplated by the present invention. As discussed above, embodiments of the invention are especially suited for use in factories and other places where parts are difficult to access. For example, the method may be used to lubricate outdoor wind turbines located high above the ground.

The method includes flying operation 302. During this operation, the UAV flies to a lubrication location proximate the machine in need of lubrication. After flying operation 302, the method continues to delivering operation 304.

At delivering operation 304, at least part of the supply of lubricant is delivered to the machine when the UAV is at the lubrication location. The UAV may spray or drip lubricant into a hole, interface, bearings, rolling elements, etc. The UAV may supply a lubricating grease, quantitatively conveyed to a lubricating grease filling position in a timed way through a grease injection joint, using a grease injection pump. Delivering operation 304 may include activating operation 306. At activating operation 306, a valve configured to pass the least part of the supply of lubricant from the UAV to the engine when the UAV is at the lubrication location is activated. Delivering operation 304 may additionally or alternatively include activating operation 308. At activating operation 308, a pump configured to pass the least part of the supply of lubricant from the UAV to the engine when the UAV is at the lubrication location is activated.

If a drone determines that a part needs lubrication, but it is unable to perform the lubrication because it is out of the appropriate lubricant, is not stocked with the appropriate lubricant, or does not possess the appropriate means of applying the appropriate lubricant, it can report the need to a database, or directly notify another drone that has appropriate lubricants or application equipment. In some cases, the drone may contain a purpose built case for housing the lubricants. An interface to a computing system may provide a lubricating guide providing lubrication instructions and identifying each product and surface where each product is applied. Lubricant containers may be color coded and numbered to correspond with the colors and numbers on the lubricating guide (this may be helpful for humans who load lubricant onto a drone), thus allowing a user to identify a specific product for a specific surface and purpose. Thus, the lubricating guide identifies a surface in need of lubrication, recommends a specific product for the task, and provides basic application directions and durability estimates.

At detecting operation 310, the UAV detects that the machine requires lubrication. Detecting operation 310 may include analyzing operation 312. During analyzing operation 312, an audio signal is analyzed to detect an audio indicator that the machine requires lubrication. The audio indicator may include a humming sound, a periodic sound, a squeaking sound, a scraping sound, and/or a clicking sound. The UAV's audio inspection includes listening for a change in sounds from a period of time in the past. The audio inspection can be enhanced by an ultrasonic gun (listening to noises in the ultrasonic range) and/or a stethoscope carried on the UAV.

Detecting operation 310 may additionally or alternatively include analyzing operation 314. During analyzing operation 314, a video signal is analyzed to detect a video indicator that the machine requires lubrication. The video indicator may include a lubricant leak, a lubricant level, a machine vibration, a pressure gauge level, burned paint, a belt thickness, and/or thermal radiation.

The UAV's video inspection may be enhanced by an infrared (IR) gun carried on the UAV. IR guns can use a laser pointer to tell the UAV where it is aiming the device. The further away from the item of interest the UAV is, the more surface area will be averaged into the reading. Also, the UAV may use an IR camera with a color scale range showing different temperatures. UAV thermal inspections may suggest the need for automated lubricant adjustment. A strobe light can be used to determine speed of a moving object.

Detecting operation 310 may additionally or alternatively include analyzing operation 316. During analyzing operation 316, an odor signal is analyzed to detect an odor indicator that the machine requires lubrication. The odor indicator may include a rubber odor, a burning oil odor and/or a burning paint odor.

If the results of the UAV's visual, tactile, odor and audio inspections do not enable it to conclude that lubrication is needed with a confidence greater than L, or that lubrication is not needed with a confidence greater than M, the UAV can share its results, optionally including a live video feed of the part in question, with a human expert. The human expert may, at his or her discretion, take control of the UAV to perform further inspections, and render a decision as whether to lubricate or not.

Tapered and spherical rolling element bearings use grease up to ten times faster than radial ball bearings. Thus, the re-greasing rate by the UAV may be adjusted for different bearing designs. If no specific re-greasing interval information is available, the following grease replenishment interval formula may be used as a starting point:

$T=K*(14*10^6/(N*\sqrt{d})-4d)$

Where T=Re-lubrication interval in hours; N=RPM; d=bearing bore in mm; K=Product of all correction factors Ft*Fc*Fm*Fv*Fp*Fd; Ft relates to temperature, Fc relates to contamination (dust), Fm relates to moisture, Fv relates to vibration, Fp relates to position, Fd relates to bearing design.

In some cases, the UAV may supply a lubricant at preset intervals without the need to rely on signals calculated on the basis of the operating time or of the total distance covered by the machine. After detecting operation 310 is completed, control passes to pumping operation 318.

At pumping operation 318, used lubricant from the machine is pumped to a lubricant reservoir carried by the UAV. The UAV may sample the used lubricant for particulate matter and viscosity. In one embodiment, the particulate matter and viscosity analysis may be used to automatically select an appropriate lubricant by the UAV.

Aspects of the present invention may be useful in places where there is a lack of technical skills (such as in the informal sectors) by assisting a human mechanic to locate a lubricant place, assess the conditions, types and needs of lubricant, and by supplying an appropriate mix of lubricants.

Although it is envisioned the UAV can be used in factories, outdoor wind turbines, and other environments with parts that are difficult to reach, embodiments of the present invention may also be used for vehicle maintenance. This relatively simple maintenance task of seeking regular oil changes may slip in some environments. A UAV lubrication service at a gas station would be a useful addition as an individual refilling gasoline. Furthermore, vehicles can be designed to actually be more accessible to such UAV lubrication service.

In one embodiment, UAVs may cooperate to fulfill a lubrication mission. A UAV may collaborate with a human mechanic (formally trained or informal) by assessing safety of the lubrication process and recommending to the mechanic. The UAV may consult safety and security guidelines for the specific auto under repair. The UAV may also plot an optimal route where it might visit parts that would require larger quantities (or denser) lubricants early, and smaller touch up jobs later.

Figure 4:
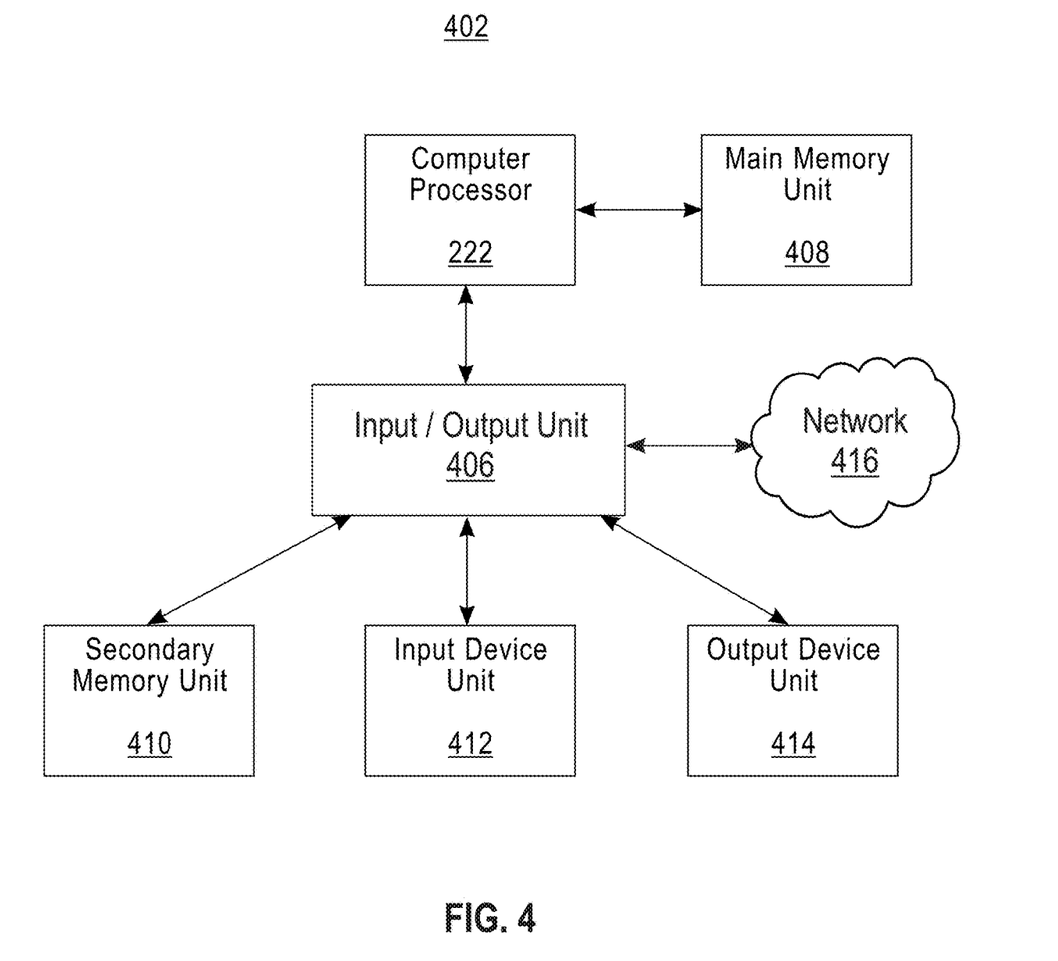
FIG. 4 shows an example computing environment used by embodiments of the present invention

FIG. 4 shows an example computing environment 402 used by embodiments of the present invention. The computing environment 402 includes a computer processor 212 coupled to an input/output (I/O) unit 406, and a main memory unit 408. The main memory unit 408 generally stores program instructions and data used by the processor 212. Instructions and instruction sequences implementing the present invention may, for example, be embodied in the main memory unit 408. Various types of memory technologies may be utilized in the main memory unit 408, such as Random Access Memory (RAM), Read Only Memory (ROM), and Flash memory.

The I/O unit 604 connects with a secondary memory unit 410, an input device unit 412, and an output device unit 414. The secondary memory unit 410 represents one or more mass storage devices, such as hard disks, floppy disks, optical disks, and tape drives. Secondary memory 410 is typically slower than the main memory unit 408, but can store more information for the same price. The input device unit 412 may include input hardware such as a keyboard or mouse. The output device unit 414 typically includes devices such as a display adapter, a monitor and a printer. The I/O unit 406 may further be connected to a computer network 416.

Arrows in FIG. 4 represent the system bus architecture of the computer, however, these arrows are for illustrative purposes only. It is contemplated that other interconnection schemes serving to link the system components may be used in the present invention. For example, a local video bus could be utilized to connect the computer processor 212 to an output device 414, even though a direct arrow between the computer processor 212 and the output device 414 is not shown.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present invention may be embodied as a system, method or computer program product. Accordingly, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer program product for lubricating a machine, the computer program product comprising:
   a non-transitory computer readable storage medium having computer readable program code embodied therewith, the computer readable program code configured to:
   fly an unmanned aerial vehicle (UAV) to a lubrication location proximate the machine, the UAV including a supply of lubricant; and
   deliver at least part of the supply of lubricant to the machine when the UAV is at the lubrication location.

2. The computer program product of claim 1, further comprising computer readable program code configured to activate a valve configured to pass the at least part of the supply of lubricant from the UAV to the engine when the UAV is at the lubrication location.

3. The computer program product of claim 1, further comprising computer readable program code configured to activate a valve configured to pass the at least part of the supply of lubricant from the UAV to the engine when the UAV is at the lubrication location.

4. The computer program product of claim 1, further comprising computer readable program code configured to detect by the UAV that the machine requires lubrication.

5. The computer program product of claim 4, wherein the computer readable program code configured to detect that the machine requires lubrication includes computer readable program code configured to analyze an audio signal to detect an audio indicator that the machine requires lubrication, the audio indicator including at least one of a humming sound, a periodic sound, a squeaking sound, a scraping sound, and a clicking sound.

6. The computer program product of claim 4, wherein the computer readable program code configured to detect that the machine requires lubrication includes computer readable program code configured to analyze a video signal to detect a video indicator that the machine requires lubrication, the video indicator including at least one of a lubricant leak, a lubricant level, a machine vibration, a pressure gauge level, burned paint, a belt thickness, and thermal radiation.

7. The computer program product of claim 4, wherein the computer readable program code configured to detect that the machine requires lubrication includes computer readable program code configured to analyze an odor signal to detect an odor indicator that the machine requires lubrication, the odor indicator including at least one of a rubber odor, a burning oil odor and a burning paint odor.

* * * * *